Figure 1:
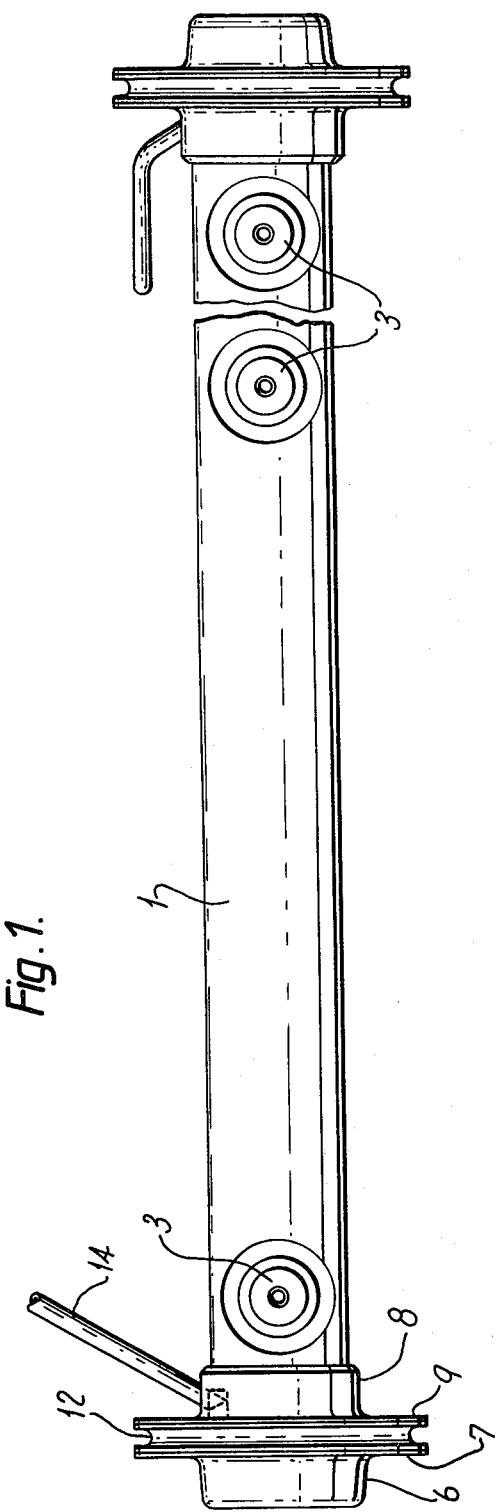

though of course they could be a separate component if desired. Furthermore the flanges 6 and 8 are, as described, of L-form. This is a preferred form since the sharp corners ensure that the welding is confined to the remote ends of the flanges, but other flange forms, for example angled or curved could be used provided the welding could be confined to the flange tips.

United States Patent [19]
Singleton

[11] 4,342,117
[45] Jul. 27, 1982

[54] MIRROR MOUNTING ARRANGEMENT FOR A LASER

[75] Inventor: Peter A. Singleton, London, England

[73] Assignee: Elliott Brothers Limited, Chelmsford, England

[21] Appl. No.: 130,049

[22] Filed: Mar. 13, 1980

[30] Foreign Application Priority Data

Mar. 26, 1979 [GB] United Kingdom ............... 7910546

[51] Int. Cl.³ .............................................. H01S 3/02
[52] U.S. Cl. .................................................. 372/107
[58] Field of Search ................... 331/94.5 D, 94.5 G, 331/94.5 T; 350/298, 310

[56] References Cited

U.S. PATENT DOCUMENTS 3,613,027 10/1971 Westermeier .................. 331/94.5 T
3,916,337 10/1975 Kindl et al. .................... 331/94.5 D
3,928,816 12/1975 Hartwick et al. ............... 331/94.5 G
4,187,474 2/1980 Hug et al. ...................... 331/94.5 D
4,250,467 2/1981 Kubota et al. .................. 331/94.5 D Primary Examiner—James W. Davie
Attorney, Agent, or Firm—Kirschstein, Kirschstein, Ottinger & Cobrin

[57] ABSTRACT

A mirror mounting arrangement for a gas laser, in which the end faces of the laser body are ground and polished to the required accuracy and form direct seatings for the end mirror. The mirror is mounted in an annular frame having an external thin flange remote from the mirror position. This flange confronts a similar flange fixed on to the laser body, the two flanges being separated by an annular gap. A double flanged spacer element which is fractionally shorter, axially, than the gap is inserted in it and welded to the adjacent flanges under axial pressure. The mirror is thus permanently urged into engagement with the laser body end face and its position and attitude fixed. The remoteness of the welding seam avoids damage to the mirror.

3 Claims, 2 Drawing Figures

U.S. Patent Jul. 27, 1982 4,342,117

MIRROR MOUNTING ARRANGEMENT FOR A LASER

This invention relates to gas or liquid lasers having a longitudinal body with an axial discharge channel and a reflecting or refracting optical member at each end of the channel. While the invention is of such general applicability, it will most commonly find application for the mounting of end mirrors in a gas laser where the end mirrors are required to be normal to the laser axis.

One problem in the manufacture of such lasers is the joining of a laser mirror to each end of the laser body in a stable pretuned manner whereby the highly reflecting mirror surfaces are situated and maintained in correct permanent alignment with respect to the lasing medium and to each other and are at the same time not degraded by the mounting process.

It has been proposed to mount mirrors and set their positions by means of tuning screws. Such means are inherently unstable, simply because the mirrors are very sensitive to the screw movement and thus to vibration and shock.

In the case of solid state laser rods one solution is for the mirrors to be formed directly on the polished rod ends.

Gas (and liquid) lasers normally require a separating element between the mirrors to hold them rigidly relative to each other and to the laser body containing the laser gas discharge, this separating element being a ceramic or metal frame.

In another arrangement the mirror is mounted directly on the end of the laser body on a seating which is curved to permit correct positioning of the mirror, which is then sealed into place by epoxy resin or by glass frit. In a further alternative the mirrors are mounted on metal tube extensions of the laser body, the attitude of the mirrors being set by distorting the tubes.

The above techniques are satisfactory for hemispherical mirror systems having perhaps 100 micro-radians misalignment tolerance, but they are not suited to long radius or plane-plane mirror configurations. In these cases the mirror setting must be of the order of 5 micro-radians or better if alignment is to be maintained indefinitely against temperature and vibration spectra.

The object of the invention is therefore to provide a laser construction having a reflecting or refracting element mounting arrangement which is rigid and permanent and to a great degree free from shock and vibration effects.

According to the present invention, a gas or liquid laser comprises a longitudinal laser body having an axial discharge channel and a reflecting or refracting optical member disposed at each end of the channel, at least one end of the laser body forming a seating for the associated optical member against which seating the said member is biased to preset its attitude to the axis of the discharge channel.

Preferably both ends of the laser body form seatings for their respective optical members.

Each member may be mounted in a flanged frame, the edge of the flange being tensioned from the laser body to provide the biasing of the optical member against the end of the laser body. The edge of the flange may be sealed by welding or brazing to the edge of a second flange which is fixed and sealed to the laser body.

A spacer member may be positioned between the first and second flanges both of which are welded or brazed to respective flanges on the spacer member, the spacer member having a dimension parallel to the axis such that abutment of both first and second flanges with the spacer member prior to welding or brazing requires stressing of the first flange.

A reservoir for the lasing medium may be provided by an annular space connected to the discharge channel, the space being bounded by the laser body, the flanged frame, a collar member around said laser body from which collar member said second flange extends, and the spacer member.

A bore may connect the reservoir to a pumping stem for evacuating the laser and for filling the laser with lasing medium.

Figure 2:
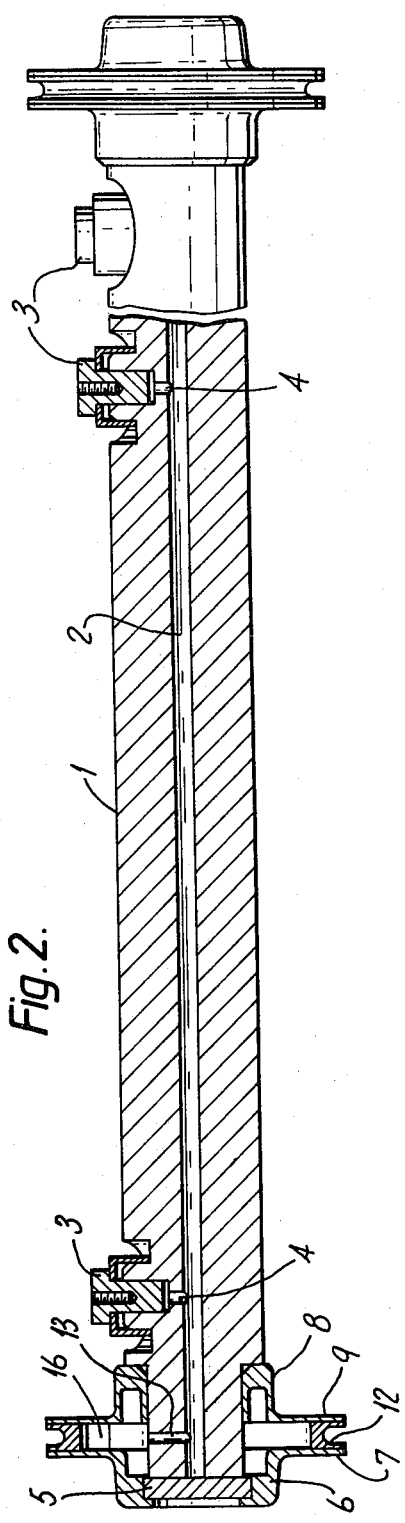

One embodiment of a laser in accordance with the invention will now be described by way of example, with reference to the accompanying drawings, of which:

FIG. 1 is a plan view of the laser, and
FIG. 2 is a part sectional elevation.

Referring to the drawings, the laser comprises a waveguide laser body 1 in the form of a thick walled ceramic tube having an axial channel 2 for the main laser discharge. Electrode assemblies 3 are mounted and sealed in the laser body, the electrodes having access to the channel 2 by way of short bore holes 4. In the particular laser in question, reflecting elements, i.e. dielectric mirrors, are required to be mounted normal to the axis of the channel 2. Each mirror 5 is mounted in the following way. The end of the laser body 1 is ground and polished flat and normal to the axis of the waveguide to provide a seating for the mirror. The flatness is within one quarter wavelength and the resulting surfaces are parallel within 5 micro radians and perpendicular to the waveguide axis within 100 micro radians.

The mirror 5 has a reflecting surface of flatness comparable to that of the polished end face of the laser body 1. The mirror 5 is mounted in a frame 6 and is sealed to it in a gas tight manner. The frame 6 has a flange 7 of substantial radial extent such as to permit slight flexing without fracture. A metal collar 8 surrounds the laser body 1 a short way in from the end and is sealed to it by brazing. The collar 8 has a flange 9 similar to the flange 7 such that, when the mirror 5 is place in position in abutment with the end of the laser body the two flanges 7 and 9 confront each other separated by a small annular gap. This gap is filled by a spacer member 12 whose axial dimension is slightly smaller than the gap between the flanges 7 and 9.

The spacer member also has small flanges which, on assembly, abut the flanges 7 and 9 respectively when clamped between them. While clamped in contact the spacer flanges are welded to the flanges 7 and 9 which subsequently remain under stress and so bias the mirror 5 into contact with the polished seating on the end of the laser body.

The mirror is thus rigidly mounted against shock and vibration and sealed to the laser body in gas tight manner. The mirror frame 6 and the collar 8 enclose a reservoir 16 which communicates with the discharge channel by means of a bore 13 so increasing the available gas volume of the laser. Evacuation of the laser and filling it with gas is then achieved by way of the bore 13, the reservoir 16, and a pumping stem 14 connected to the reservoir.

Both mirrors are mounted in the above manner although it would of course be possible to mount them in different ways if it were convenient for any purpose.

The described method of mounting has the further advantage that the final seal is made without the use of epoxy resin and also that the welding process is remote from the mirror itself and avoids degrading it.

Clearly a mirror or refracting element could be mounted by the same method with its reflecting/refracting surface at any desired angle to the axis, the frame of this optical element being designed accordingly.

I claim:

1. In a laser having a longitudinal laser body, an axial discharge channel in said laser body and a reflecting or refracting optical member disposed at each end of said channel, that improvement constituting: a seating for each said optical member, each said seating comprising a flanged frame in which a said optical member is mounted, a second flange fixed and sealed to the laser body, the flanges being pre-stressed and fixed together by welding to bias the optical member against the end of the laser body and pre-set its attitude to the axis of the discharge channel.

2. In a laser according to claim 1, said seating comprises a spacer member positioned between the first said flange and said second flange both of which are welded or brazed to respective flanges on the spacer member, the spacer member having a dimension parallel to said axis such that abutment of both first and second flanges with said spacer member prior to welding or brazing requires stressing of the first flange.

3. In a laser according to claim 2, said seating comprises a reservoir for the lasing medium provided by an annular space connected to the discharge channel, said space being bounded by the laser body, the flanged frame, a collar member around said laser body from which collar member said second flange extends, and the said spacer member.

* * * * *